US008565244B2

(12) United States Patent
Bragg et al.

(10) Patent No.: US 8,565,244 B2
(45) Date of Patent: Oct. 22, 2013

(54) RESILIENT PROVIDER LINK STATE BRIDGING (PLSB) VIRTUAL PRIVATE LAN SERVICE (VPLS) INTERWORKING

(75) Inventors: Nigel L. Bragg, Weston Colville (GB); David Allan, Ottawa (CA); Peter Ashwood Smith, Gatineau (CA); Paul Ungehagen, Apex, NC (US)

(73) Assignee: Rockstar Consortium US LP, Plano, TX (US)

( * ) Notice: Subject to any disclaimer, the term of this patent is extended or adjusted under 35 U.S.C. 154(b) by 67 days.

(21) Appl. No.: 12/334,013

(22) Filed: Dec. 12, 2008

(65) Prior Publication Data
US 2009/0201937 A1   Aug. 13, 2009

(30) Foreign Application Priority Data
Feb. 9, 2008   (GB) .................................... 0802371.5

(51) Int. Cl.
*H04L 12/28* (2006.01)

(52) U.S. Cl.
USPC ............................ 370/401; 370/256; 370/389

(58) Field of Classification Search
USPC .......................................... 370/401, 256, 389
See application file for complete search history.

(56) References Cited

U.S. PATENT DOCUMENTS

| | | | | |
|---|---|---|---|---|
| 7,443,800 B2* | 10/2008 | Imai | | 370/238 |
| 7,617,318 B2* | 11/2009 | Shiga et al. | | 709/228 |
| 7,688,756 B2* | 3/2010 | Allan et al. | | 370/254 |
| 7,894,450 B2* | 2/2011 | Unbehagen et al. | | 370/395.3 |
| 8,059,647 B2* | 11/2011 | Ashwood-Smith et al. | | 370/390 |
| 8,223,668 B2* | 7/2012 | Allan et al. | | 370/254 |
| 8,270,319 B2* | 9/2012 | Casey et al. | | 370/256 |
| 2003/0026271 A1* | 2/2003 | Erb et al. | | 370/401 |
| 2003/0174706 A1* | 9/2003 | Shankar et al. | | 370/393 |
| 2004/0165600 A1* | 8/2004 | Lee | | 370/395.53 |
| 2005/0083949 A1* | 4/2005 | Dobbins et al. | | 370/395.53 |
| 2005/0265328 A1* | 12/2005 | Bettink | | 370/389 |
| 2006/0047907 A1* | 3/2006 | Shiga et al. | | 711/114 |
| 2006/0245436 A1* | 11/2006 | Sajassi | | 370/395.53 |

(Continued)

FOREIGN PATENT DOCUMENTS

GB   2422508 A   7/2006

OTHER PUBLICATIONS

Provider Link State Bridgine (PLSB) by Don Fedyk and Paul Bottorff, Nortel Networks; Jan. 2007.*

*Primary Examiner* — John Blanton
*Assistant Examiner* — Jay P Patel
(74) *Attorney, Agent, or Firm* — Pearne & Gordon LLP

(57) ABSTRACT

A method of peer interfacing a Link-State controlled network domain with an Ethernet Bridging controlled network domain. A pair of peer attachment points are provided between the Link-State controlled network domain and the Ethernet Bridging domain. The peer attachment points are respective endpoints of a set of one or more LAN segments defined within the Ethernet Bridging domain. The set of LAN segments are represented as a virtual node in the Link-State controlled network domain. The virtual node is represented in the Link-State controlled network domain as connected to each of the peer attachment points via a respective virtual link. The virtual links are configured such that frames to or from an address in the Link-State controlled network domain are forwarded over a tree passing through only one of the peer attachments points.

23 Claims, 2 Drawing Sheets

(56) References Cited

U.S. PATENT DOCUMENTS

| | | | |
|---|---|---|---|
| 2007/0086361 A1* | 4/2007 | Allan et al. | 370/254 |
| 2007/0165657 A1* | 7/2007 | Smith et al. | 370/401 |
| 2008/0095176 A1* | 4/2008 | Ong et al. | 370/400 |
| 2009/0041023 A1* | 2/2009 | Ould Brahim et al. | 370/395.3 |
| 2009/0161681 A1* | 6/2009 | Madrahalli et al. | 370/401 |
| 2009/0168666 A1* | 7/2009 | Unbehagen et al. | 370/254 |
| 2010/0020797 A1* | 1/2010 | Casey et al. | 370/390 |
| 2012/0300774 A1* | 11/2012 | Casey et al. | 370/390 |

* cited by examiner

RESILIENT PROVIDER LINK STATE BRIDGING (PLSB) VIRTUAL PRIVATE LAN SERVICE (VPLS) INTERWORKING

CROSS-REFERENCE TO RELATED APPLICATIONS

This application is based on, and claims priority of British Patent Application No. 0802371.5 filed Feb. 9, 2008.

MICROFICHE APPENDIX

Not Applicable.

TECHNICAL FIELD

The present invention relates to management of traffic forwarding in frame networks, and in particular to methods of interfacing Provider Link State Bridging (PLSB) and Virtual Private LAN Service (VPLS) network domains.

BACKGROUND OF THE INVENTION

Network operators and carriers are deploying frame-switched communications networks in place of circuit-switched networks. In frame-switched networks such as Internet Protocol (IP) networks, IP frames are forwarded according to routing state stored at each IP router in the network. Similarly, in Ethernet networks, Ethernet frames are forwarded according to forwarding state stored at each Ethernet switch in the network. The present invention applies to communications networks employing any Protocol Data Unit (PDU) based network and in this document, the terms "frame" and "frame-switched network", "routing", "frame" and "frame-based network", "forwarding" and cognate terms are intended to cover any PDUs, communications networks using PDUs and the selective transmission of PDUs from network node to network node.

Multicast forwarding of data frames (where frames are sent from a source node to multiple destination nodes more or less simultaneously) is of increasing importance as demand for services such as Internet Protocol Television (IPTV) and Video on Demand (VoD) grows.

Protocols such as Intermediate System-Intermediate System (IS-IS) or Open Shortest Path First (OSPF) are used to disseminate network topology information used to calculate paths for forwarding frames from a plurality of source nodes to one or more destination nodes, typically through one or more intermediate nodes, and to install the forwarding state required to implement those paths. OSPF and IS-IS are run in a distributed manner across nodes of the network so that, for example, when a topology change occurs in the network such as a node or link failure, this information is flooded to all nodes by the protocol's operation, and each node will locally recompute paths to circumvent the failure based on a consistent view of network topology.

In Ethernet networks, Provider Backbone Transport (PBT), also known as Provider Back-Bone Bridging-Traffic Engineering (PBB-TE), as described in Applicant's British patent number GB 2422508 is used to provide a unicast Ethernet transport technology. Provider Link State Bridging (PLSB) as described in Applicant's co-pending U.S. patent application Ser. No. 11/537,775 will be used to provide a multicast transport capability for Ethernet networks using IS-IS to set up unicast paths and multicast trees in the network. Both above patent documents are hereby incorporated by reference.

Many network operators have deployed Multi Protocol Label Switching (MPLS) as their frame switched network transport technology, with an overlay technology called Virtual Private LAN Service (VPLS) providing the infrastructure for customer any-to-any connectivity (E-LAN services) delivered over restricted (typically metro scale) network domains. VPLS is an Ethernet LAN emulation provided over MPLS. Within this document, the terms VPLS and Ethernet LAN segment are used interchangeably to describe the service offered to the end-customer.

A problem with VPLS is that it scales poorly, in particular because customer Media Access Control (C-MAC) addresses are exposed to the VPLS domain. Further, VPLS constructs a full mesh of pseudo-wires between every node with a point of presence for any specific service, so the telemetry associated with a VPLS service instance scales in proportion to the square of the number of end points. Finally the full mesh of pseudo wires means that any flooding of frames is inefficient, as all frame replication must be performed at the ingress to the pseudo-wire mesh. In cases where the number of pseudo-wires exceeds the number of physical links traversed at a given point, multiple copies of the same frame will be sent on each physical link.

One approach to mitigating this scaling problem is to use Hierarchical VPLS (H-VPLS), which uses multiple hub and spoke architectures at the edges to contain the size of the fully-meshed transport core, and thus limit the number of transport connections required. This approach has the penalty alluded to above, in that the gateways between edge and core are exposed to the full range of C-MAC addresses, which was already a severe scaling limitation. It also introduces additional complexity to address resiliency issues as it requires multi-homing of the spokes onto the core mesh.

An increasingly preferred approach to the scaling problems of VPLS is to use Provider Backbone Bridges (PBBs)—standardized as IEEE 802.1ah—at the edges of the VPLS core, to separate the C-MAC address spaces from the operator backbone MAC (B-MAC) address space through encapsulation. In this way, a VPLS domain is typically exposed to a small number of B-MAC addresses summarizing a much larger set of C-MAC addresses which would typically be found on a customer LAN segment.

However the deployment of PBB overlaid on existing VPLS suffers limitations in that interworking between a PBB Network and legacy ports (i.e. where the peer VPLS Provider Edge router, PE, is not configured to support Backbone Edge Bridging) presents numerous challenges and complexity, and in any case the combination of VPLS and PBB only has the capability to address some of the scaling issues of VPLS.

An alternative approach is to migrate towards a PLSB core network as PLSB overcomes many of the shortcomings of VPLS with respect to multicast efficiency, resiliency and ease of provisioning. It is desirable to be able to do this without perturbing existing deployed customer facing VPLS ports and at the same time maximizing the utilization of deployed assets. Similarly where VPLS has been deployed in the core and the decision has been made to deploy PLSB in the metro, it is desirable to use the deployed MPLS/VPLS capacity until such point as network load and economics mandates direct interconnect of subtending PLSB metro area networks.

Therefore a means of resilient and efficient interconnect of PLSB and existing VPLS is highly desirable. This needs to be true where VPLS subtends the Link-State controlled domain (User Network Interface (UNI) interconnect) and where VPLS simply lends transit capacity to Link-State controlled domain (Network Network Interface (NNI) interconnect).

SUMMARY OF THE INVENTION

Thus, an aspect of the present invention provides a method of peer interfacing a Link-State controlled network domain with an Ethernet Bridging controlled network domain. A pair of peer attachment points are provided between the Link-State controlled network domain and the Ethernet Bridging domain. The peer attachment points are respective endpoints of a set of one or more LAN segments defined within the Ethernet Bridging domain. The set of LAN segments are represented as a virtual node in the Link-State controlled network domain. The virtual node is represented in the Link-State controlled network domain as connected to each of the peer attachment points via a respective virtual link. The virtual links are configured such that frames to or from an address in the Link-State controlled network domain are forwarded over a tree passing through only one of the peer attachments points.

In some embodiments the Ethernet Bridging domain subtends the Link-State controlled domain and exchanges frames at the C-MAC layer (UNI interworking), and in other embodiments the Ethernet Bridging domain peers with the Link-State controlled domain at the B-MAC layer (NNI interworking).

For the UNI interworking scenario, at least two attachment points are provided between the PLSB domain and each subtending VPLS domain. Each attachment point comprises a VPLS gateway interconnected with a PLSB gateway, the VPLS gateway being an end-point of one or more sets of virtual LAN segments defined within the VPLS domain, each virtual LAN segment corresponding to a customer service instance. Each set of virtual LAN segments (VLANs) is represented as a virtual node of the PLSB domain. The modelling of virtual node connectivity to the respective PLSB gateway of each attachment point uses a respective virtual link with specific metric assignment, such that every path on the shortest path tree computed by the PLSB domain between the set of virtual LAN segments and every destination address in the PLSB domain will traverse the respective PLSB gateway of only one of the at least two attachment points at any given time.

For the NNI interworking scenario, VPLS can be configured a priori to provide at least one VPLS LAN segment, each of which has one or more unique physical points of interconnect with each PLSB domain. Each of the VPLS LAN segments supports multiple infrastructure "virtual LAN segments". IS-IS discovery procedures will correctly model each VPLS LAN segment as a topology component in the PLSB network and will install MAC filtering at the PLSB/VPLS boundary nodes accordingly. Failure of any component of a VPLS LAN segment will be reflected in the PLSB IS-IS routing system, and connectivity will be rerouted to use the surviving connectivity accordingly.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method for management of traffic forwarding in frame networks, and in particular to methods of interfacing Link State protocol controlled network domains and Virtual Private LAN Service (VPLS) network domains. Embodiments of the invention are described below, by way of example only, with reference to FIGS. 1-4.

PLSB as described in Applicant's co-pending U.S. patent application Ser. No. 11/537,775 provides a link state control plane for Ethernet networks using IS-IS to disseminate information that permits local computation and set up unicast paths and multicast trees in the network. The above patent document is hereby incorporated by reference. Like PBB, PLSB uses encapsulation to hide the C-MAC address spaces from the backbone operator network, facilitating scalability and security. PLSB is a "routed" infrastructure technology; and the IS-IS control plane makes nodes aware of the network topology, and the route to any specific B-MAC address. Consequently Spanning Tree Protocol (STP) and auto learning of forwarding state are not used on PLSB nodes. Furthermore, instead of the conventional broadcasting of frames with unknown destination addresses, PLSB nodes discard any frames with unknown addresses. A useful and important property of PLSB when interfacing with existing Ethernet or Ethernet "emulation" is that the forward and reverse paths between any two points follow the same route or are "congruent". This at a micro level corresponds to existing Ethernet practice.

Figure 1A:
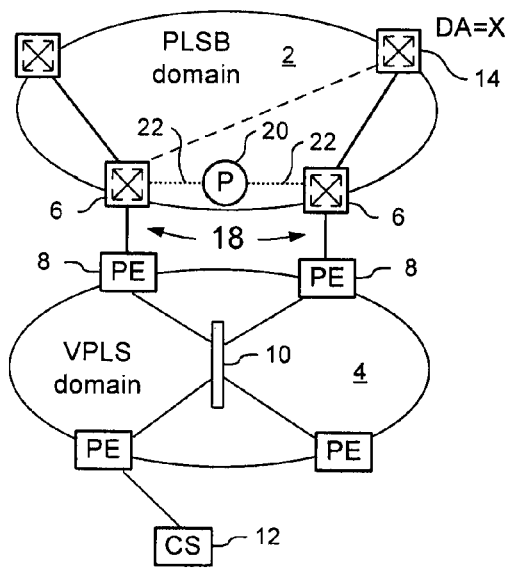
FIG. 1 is a block diagram schematically illustrating a method of interfacing VPLS and PLSB domains in accordance with a first representative embodiment of the present invention.
Figure 1B:
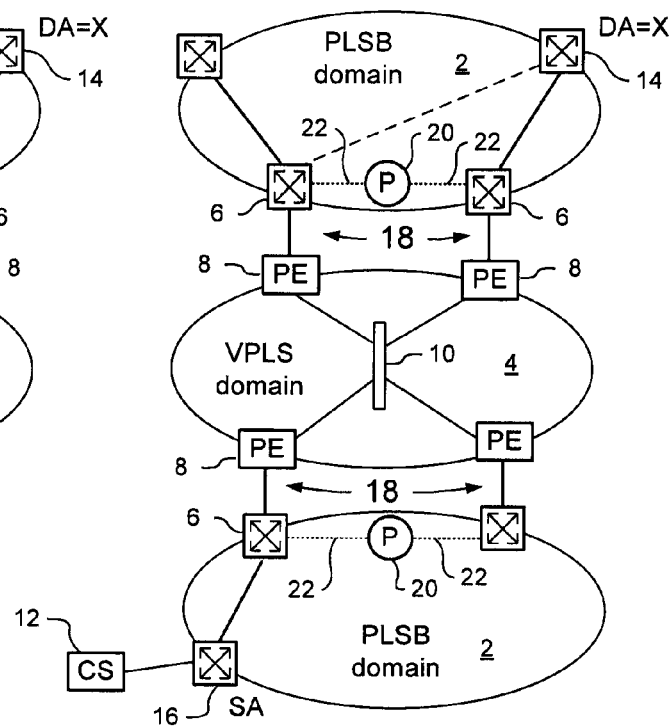

As shown in FIGS. 1a-b, PLSB and VPLS networks 2, 4 can be interconnected using suitable PLSB gateways 6 (eg Backbone Edge Bridges, BEBs, or Backbone Core Bridges, BCBs) and conventional VPLS Provider Edge routers (PEs) 8. According to the present invention, scalability and resiliency issues inherent to VPLS are overcome by using VPLS merely to establish virtual LAN (VLAN) segments 10 between VPLS PEs 8. Network intelligence, in terms of traffic forwarding, failure recovery, and loop prevention is provided exclusively within the PLSB domain.

FIG. 1a illustrates an embodiment implementing UNI interworking, in which a client system (CS) 12 in the VPLS domain is interconnected with a destination address (DA=X) 14 in the PLSB domain. FIG. 1b illustrates an embodiment implementing NNI interworking, in which a path is set up between a source address (SA) 16 and a destination address (DA=X) 14 in a PLSB domain 2 which traverses the VPLS domain 4. As may be appreciated, in the embodiment of FIG. 1b, the source and destination addresses 14, 16 may be in the same PLSB domain, or in different PLSB domains, as desired.

Normally, both UNI and NNI ports of a PLSB Backbone Edge Bridge (BEB) would be separate physical interfaces. However, through VLAN partitioning of a physical interface, it is possible to envision the coexistence of both types of interworking on a single interface. In the embodiment of FIGS. 1a-b, a set of two attachment points 18 are provisioned to connect the VPLS domain to the PLSB domain. Each attachment point comprises a respective VPLS PE gateway 8 interconnected with a PLSB gateway 6 to permit bi-directional frame transfer. Each VPLS PE gateway 8 serves as an end-point of LAN segments 10 defined within the VPLS domain 4, and so can send and receive traffic of the VPLS domain 4. Similarly, the PLSB gateway 6 of each attachment point 18 can serve as an end-point (UNI interworking) or a transit point (NNI interworking) for unicast and multicast paths defined within the PLSB domain 2.

In both the UNI and NNI interworking cases, VPLS simply offers LAN segments 10, while their role in the network (i.e. UNI or NNI) is determined by how PLSB uses them. Traffic flows through the LAN segments 10 are controlled by filtering imposed by PLSB in order to properly control the connectivity and provide loop free operation. To facilitate this operation, the LAN segment 10 is modelled in the PLSB domain as a virtual node 20.

UNI Interworking

Referring to FIG. 1a, in UNI interworking, the filtering is performed at the PLSB service layer where the association of a frame with a specific Service Instance Identifier (I-SID) is extended into the VPLS domain 4 via the use of service tagging (typically I-SID to IEEE 802.1ad S-tag mapping) such that a single point of attachment for each service instance can be enforced by filtering at the PLSB gateway 6 of each attachment point 18. In order to enable PLSB to control traffic routing to or from the VPLS domain 4, each set of virtual LAN segments 10 is associated with a respective set of I-SIDs, and represented as associated with a virtual node 20 in the PLSB domain 2. The virtual node 20 is modelled in IS-IS via gateway advertisements as being connected to the respective PLSB gateway of each attachment point 18 via a virtual link 22. With this arrangement, respective costs of the virtual links 22 can be manipulated to force every path on the shortest path tree between the set of LAN segments 10 associated with a virtual node 20 and every destination address 14 in the PLSB domain 2 to traverse only one of the attachment PLSB gateways 6 at any given time. In the event that the preferred path fails for whatever reason, normal IS-IS procedures will cause a different path to be computed to the virtual node 20, and the associated forwarding state to be installed in the PLSB domain.

Figure 3:
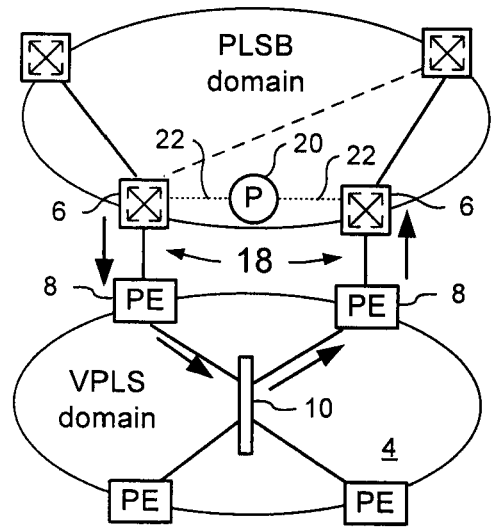
FIG. 3 is a block diagram schematically illustrating a potential loop.

In embodiments in which a common VPLS LAN segment 10 is connected to multiple points of attachment 18, frames injected into the VPLS LAN segment 10 at one point of attachment 18 will emerge at each of the other points of attachment 18, as may be seen in FIG. 3. However, as noted above, by suitably manipulating the respective costs assigned to each virtual link 20, the shortest path to or from the virtual node 20 representing the VPLS LAN segment 10 will traverse only one PLSB gateway 6, which is the preferred point of attachment 18 for all services associated with that virtual node 20. Consequently, the PLSB gateways 6 in the other attachment point(s) 18 will not contain forwarding state for that VPLS LAN segment 10 either to or from the PLSB domain 2. Any frames received from that VPLS LAN segment 10 at other than the preferred point of attachment 18 for the service will simply be discarded. Similarly any frame sent from VPLS into PLSB via the preferred point of attachment 18 will not be reinserted back into the VPLS network 4 at any other points of attachment 18. PLSB itself will only use the preferred point of attachment 18 for frames originating outside of VPLS which are sent to the VPLS domain 4.

In the embodiment of FIG. 1, the VPLS gateways 8 of both attachment points 18 are connected to a single, multi-homed LAN segment 10. In this case, however, the conventional "broadcast on unknown destination address" operation of the VPLS domain does not create any difficulties, because only the preferred PLSB gateway 6 will contain multicast forwarding state for any given I-SID in the PLSB domain 2 for the given LAN segment 10.

Unlike H-VPLS or PBB front-ended implementations, where Spanning Tree Protocol (STP) would inefficiently disable the connection at all but one gateway for all traffic, PLSB only disables the connection at all but one gateway for traffic on a common VPLS LAN 10 associated with a set of I-SIDs and represented as a virtual node 20 in the PLSB domain 2. Other sets of I-SIDs can each be represented in the PLSB domain 2 by a respective virtual node 20, and the virtual link costs to each virtual node 20 can be independently manipulated as described above. Thus, by using PLSB, efficient multi-homing of the interface between a VPLS domain 2 and an external domain is enabled and the benefits of load balancing and resilient handover between multi-homed connections are enabled.

The nature of PLSB operation is that it selects a symmetric single shortest path between any set of nodes and incorporates loop avoidance in the operation of the control plane to ensure the single path property is maintained through periods of network instability. Numerous other link state driven technologies upon which an Ethernet service can be overlaid such as MPLS or IP can also benefit from this resilience approach providing accommodations are made for the more generalized scenario of connectionless networking which permits simultaneous existence of multiple paths to a given destination and does not inherently enforce single shortest path. In this scenario the technique of metric manipulation ensures that the preferred point of attachment is the only node to which downstream traffic is directed by the link state network. An additional coordination mechanism is also required between the preferred point of attachment and the other nodes in the upstream direction to ensure that all but the preferred point of attachment block upstream traffic as this will not be a property of normal network operation. In a preferred embodiment, a coordination channel is used between the points of attachment in a "break before make" fashion to ensure the points of attachment are synchronized prior to the blocking or unblocking of upstream ports and advertising changes into the link state control system. Such a channel may also be used for state synchronization between the points of attachment when such additional coordination is required to have multiple nodes emulate attachment to a virtual node. An example of such information is VPLS label bindings.

NNI Interworking

In NNI interworking, all MAC addresses exposed to VPLS are B-MAC layer addresses. MAC level filtering is directly controlled by PLSB at the edges of the VPLS domain. Each LAN segment 10 in the VPLS domain 4 dedicated to PLSB operation appears in the PLSB topology via the technique of modelling the LAN segment 10 as a "virtual node" 20. This permits PLSB to compute paths across the network that include the VPLS LAN segments 10 as topological components and installing both forwarding and filtering state accordingly. The flooding of PLSB B-MAC addresses by VPLS will naturally be pruned by the filtering function at peer PLSB nodes connected to VPLS. This is facilitated by the fact that in a given Backbone VLAN, PLSB operation dictates a single shortest path to or from any given node in the network.

It is possible to achieve additional efficiencies in the NNI interworking scenario. Referring to FIG. 1b, it can be seen that the benefits of load balancing and resilient handover between multi-homed connections can be provided with the implementation of only one VPLS LAN segment 10 dual-homed on the PLSB domain 2. However, recovery from a network failure (in either domain) requires that both domains 2,4 compute new forwarding state. More particularly, PLSB must first compute new forwarding state to use an alternate PLSB gateway 6 to re-establish traffic flow to or from the VPLS domain 2; and then VPLS must unlearn its previous forwarding state (e.g. via MAC withdraw/invalidation messaging) and then learn new forwarding state. Since PLSB is a Link State Protocol technology, recovery in the PLSB domain is relatively fast. However, recovery in the VPLS domain tends to be much slower.

Figure 2:
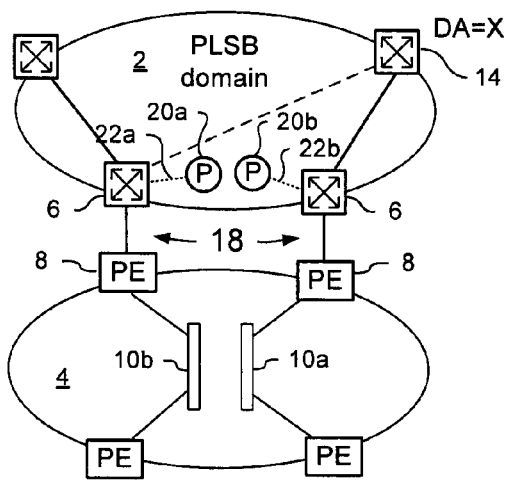
FIG. 2 is a block diagram schematically illustrating a method of interfacing VPLS and PLSB domains in accordance with a second representative embodiment of the present invention.
Figure 4:
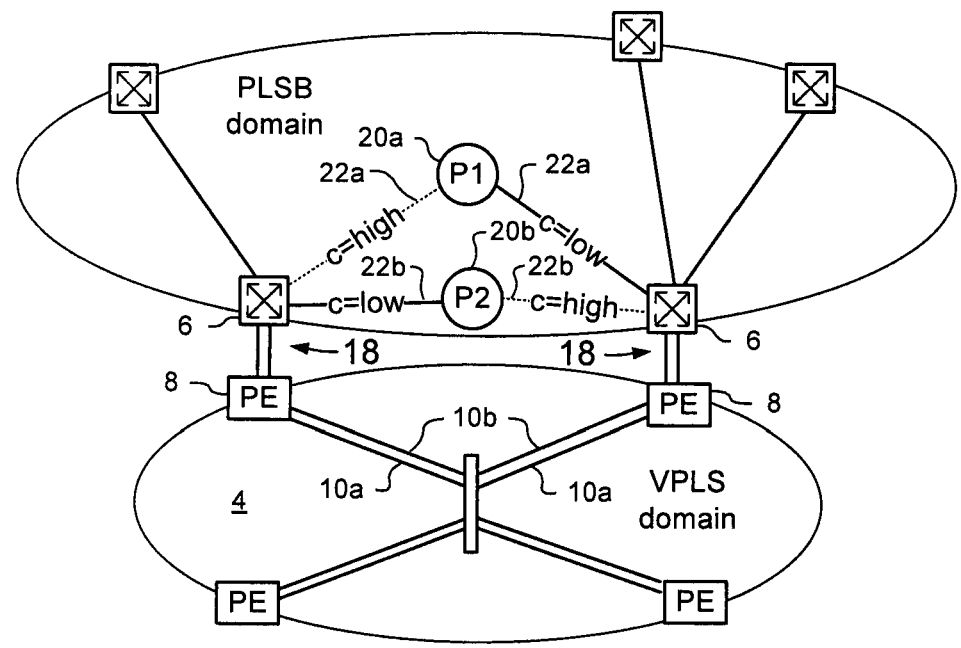
FIG. 4 is a block diagram schematically illustrating a method of interfacing VPLS and PLSB domains in accordance with a fifth representative embodiment of the present invention, which avoids the potential loop of FIG. 3.

Referring to FIGS. 2 and 4, this problem may be overcome by provisioning two or more separate LAN segments 10 within the VPLS domain 4 dedicated to PLSB operation. For example, a separate LAN segment 10 can be provided in the VPLS domain 4 for each attachment point 18 to the PLSB domain 2. In the example illustrated in FIG. 2, two LAN segments 10a,10b are provided, each of which is single-homed onto one of the two attachment points 18 to the PLSB domain 2. In the example illustrated in FIG. 4, two parallel LAN segments 10a,10b are provided, each of which is dual-homed onto both of the two attachment points 18. Other configurations are equally possible. A separate virtual node 20a,20b is provided for each LAN segment 10a, 10b. The PLSB domain 2 will choose which LAN segment 10 to use for any given connection using conventional shortest path calculations (e.g. IS-IS), and the respective "cost" assigned to each of the virtual links 22a, 22b. Because the VPLS LAN segments 10 "learn", and the IS-IS protocol of PLSB overlaid on VPLS coordinates the surrounding PLSB nodes, the shifting of connectivity for a given MAC address from one VPLS LAN 10 to the other does not involve the invalidation of any MAC information in the VPLS domain 4. The MAC address is either known in the VPLS LAN segment 10 currently used by PLSB or will promptly be learned. PLSB control plane exchange, computation and convergence ensures that the points of attachment 18 agree on transit points for a given MAC address.

In some embodiments, the costs assigned to the virtual links 10 can be based on an available capacity of the corresponding LAN segments 10, so that PLSB path computations will "naturally" use the attachment point 18 and LAN segment 10 on the unique shortest path for a given connection. In other cases, it may be advantageous to assign costs to the virtual links 22 is such a way as to force the PLSB path computation to select a desired attachment point 18 and/or LAN segment 10 for a connection. Examples using this latter alternative are described below.

Advantageously, PLSB will naturally utilize both LAN segments 10 simultaneously, the degree depending on how IS-IS computation determines the paths through the PLSB network 2. A failure that impacts some portion of one VPLS LAN segment 10 will be reflected in PLSB computations and it will simply cause the affected portion of the traffic matrix to be moved over to the other VPLS LAN segment 10. As the VPLS LAN segments 10 are parallel and distinct entities there is nothing for VPLS to unlearn as a consequence of the transition; the new segment will simply learn the required connectivity, and what had already been learned on the old segment will merely be unused. As may be appreciated, this accomplishes the effect of protection switching, without requiring VPLS to perform any unlearning of connectivity via the failed connection. This avoids the failure recovery delays and control plane overhead inherent to normal VPLS operation.

As may be appreciated, improved load balancing can be provided by using multiple backbone VLAN IDs (B-VIDs) in the PLSB domain 2. For example, each LAN segment 10 may be associated with a respective B-VID in the PLSB domain 2. If each LAN segment 10 appears at all physical interfaces, then load balancing between each LAN segment 10 can be obtained based on PLSB equal-cost multi-path calculations, rather than just the unique shortest path to a given destination address.

The embodiment of FIG. 2 utilizes two virtual nodes; one for each attachment point 18. This arrangement is beneficial in that it also enables load distribution, on a per I-SID basis, across all of the attachment points 18 between the VPLS and PLSB domains. However, it will be appreciated that this is not essential. The same methods can equally be employed using a single virtual node for handling traffic of all of the LAN service instances provisioned within the VPLS domain 4. Thus in general, the number of virtual nodes 20 may be less than, equal to, or greater than the number of attachment points 18, as desired.

It is also possible to envision an integrated node that performs control plane exchange and direct interworking with both the VPLS and PLSB networks. The manner in which VPLS is modelled in the PLSB control plane is unaffected by this variation. Integrated nodes have sufficient information locally to prune the set of pseudo wires that multicast frames are replicated on. Integrated nodes and non-integrated nodes can be combined in the same network. The preferred embodiment for resilience is still two points of attachment between PLSB and VPLS domains and this may be in the form of links between nodes that implement only one of the two technologies, or integrated nodes that perform both data plane and control plane interworking.

The VPLS service model is that of an Ethernet LAN segment, so it is possible to envision other technologies being substituted for VPLS as is warranted by a combination of economics and operational behaviour. A Provider Bridged (802.1ad) network can be substituted directly for a VPLS network, although such a substitution is only envisioned as advantageous where it is already deployed in the metro and is interconnected with PLSB in a UNI interworking scenario.

The foregoing description describes methods of interfacing a PLSB domain with a VPLS domain. Those of ordinary skill in the art will recognise, however, that these same techniques can be used to interface network domains configured under other protocols, so that the present invention is not limited to PLSB and VPLS interfacing. In particular, PLSB is an example of an Ethernet-based Link-State controlled protocol, whereas VPLS is a example of an Ethernet Bridging protocol. If used with the additional coordination mechanisms described above in paragraph 0035, VPLS may alternatively be used to create a Link-State controlled network domain upon which Ethernet bridging is overlaid. Other known technologies which may be used to create a Link-State controlled network domain upon which Ethernet bridging is overlaid include, for example, Transparent Interconnection of Lots of Links (TRILL). Further examples of Ethernet-based Link-State control protocols include, for example, Link State Bridging, and also the Shortest Path Bridging (SPB) and Shortest Path Backbone Bridging (SPBB) protocols being developed by the IEEE in the IEEE 802.1aq project. As such, it will be seen that the techniques of the present invention can be used to interface any Ethernet-based Link-State controlled network domain or Link-State controlled network domain upon which Ethernet bridging is overlaid with an Ethernet Bridging controlled network domain.

The embodiment(s) of the invention described above is(are) intended to be exemplary only. The scope of the invention is therefore intended to be limited solely by the scope of the appended claims.

We claim:

1. A method of peer interfacing a Link-State controlled network domain with an Ethernet Bridging controlled network domain, the method comprising;
    providing a pair of peer attachment points between the Link-State controlled network domain and the Ethernet Bridging domain, the peer attachment points being respective endpoints of a set of one or more LAN segments defined within the Ethernet Bridging domain;
    representing the set of LAN segments as a virtual node in the Link-State controlled network domain;
    defining, in the Link-State controlled network domain, a respective virtual link connecting the virtual node to each peer attachment point; and
    configuring, in the Link-State controlled network domain, the virtual links such that frames to or from an address in the Link-State controlled network domain are forwarded over a tree passing through only one of the peer attachments points.

2. The method of claim 1, wherein the set of LAN segments comprises at least one LAN segment that is dual-homed on both of the peer attachment points.

3. The method of claim 1, wherein the Link-State controlled network domain is a Provider Link State Bridging (PLSB) domain, and the Ethernet Bridging controlled network domain is a Virtual Private LAN Service (VPLS) network domain.

4. The method of claim 3, wherein each attachment point comprises a PLSB gateway connected to a VPLS gateway, the PLSB gateway being an endpoint of at least an unicast path of the PLSB domain, and the VPLS gateway being an endpoint of the set of the LAN segments.

5. The method of claim 1, wherein configuring the virtual links comprises assigning a respective predetermined cost to each virtual link, such that every path on the shortest path tree computed by the Link-State controlled network domain between the set of LAN segments and every address in the Link-State controlled network domain traverses only one of the peer attachment points.

6. The method of claim 5, wherein configuring each virtual link comprises;
    setting the predetermined cost assigned to a first virtual link connected to a selected one of the attachment points based on an available capacity of the set of LAN segments; and
    setting the predetermined cost assigned to a second virtual link artificially high, such that, under fault free conditions a shortest path computed in the Link-State controlled network domain will never traverse the attachment point connected to the second virtual link.

7. The method of claim 1, wherein the pair of peer attachment points are selected from among a plurality of attachment points between the Link-State controlled network domain and the Ethernet Bridging domain.

8. The method of claim 7, wherein two or more virtual nodes are provided, each virtual node being connected via virtual links to a respective pair of peer attachment points and representing in the Link-State controlled network domain a respective set of LAN segments.

9. The method of claim 8, wherein at least one of the plurality of attachment points is a member of at least two pairs of peer attachment points.

10. A method of overlaying a Link-State protocol on an Ethernet Bridging network domain, the method comprising;
    providing a plurality of attachment points between a Link-State protocol domain and the Ethernet Bridging network domain;
    defining a set of one or more LAN segments in the Ethernet Bridging network domain, each LAN segment extending between a unique set of two or more of the attachment points;
    representing the set of LAN segments as a respective virtual node defined in the Link-State protocol domain; and
    defining, in the Link-State protocol domain, a respective virtual link connecting the virtual node to each one of the unique set of two or more of the attachment points;
    such that each LAN segment is treated, in the Link-State protocol domain, as a link of the Link-State protocol domain for the purpose of computing a shortest path between a source address in the Link-State protocol domain and a destination address in the Link-State protocol domain.

11. The method of claim 10, wherein the Link-State protocol domain is a Provider Link State Bridging (PLSB) domain, and the Ethernet Bridging network domain is a Virtual Private LAN Service (VPLS) network domain.

12. The method of claim 10, wherein each attachment point comprises a PLSB gateway connected to a VPLS gateway, the PLSB gateway being an endpoint of at least a unicast path of the PLSB domain, and the VPLS gateway being an endpoint of at least one of the VPLS LAN segments.

13. The method of claim 10, wherein the Link-State protocol domain comprises respective first and second Link-State protocol domains, and wherein the source address is in the first Link-State protocol domain, and the destination address is in the second Link-State protocol domain.

14. The method of claim 13, wherein each of the one or more LAN segments are attached to a subset of the attachment points in each Link-State protocol domain.

15. A system for peer interfacing a Link-State controlled network domain with an Ethernet Bridging controlled network domain, the system comprising;
    a pair of peer attachment points between the Link-State controlled network domain and the Ethernet Bridging domain, the peer attachment points being respective endpoints of a set of one or more LAN segments defined within the Ethernet Bridging domain;
    a virtual node defined in the Link-State controlled network domain for representing the set of LAN segments; and
    a respective virtual link defined in the Link-State controlled network domain for connecting the virtual node to each peer attachment point
    wherein the virtual links are configured, in the Link-State controlled network domain, such that frames to or from an address in the Link-State controlled network domain are forwarded over a tree passing through only one of the peer attachments points.

16. The system as claimed in claim 15, wherein the set of LAN segments comprises at least one LAN segment that is dual-homed on both of the peer attachment points.

17. The system as claimed in claim 15, wherein the Link-State controlled network domain is a Provider Link State Bridging (PLSB) domain, and the Ethernet Bridging controlled network domain is a Virtual Private LAN Service (VPLS) network domain.

18. The system as claimed in claim 17, wherein each attachment point comprises a PLSB gateway connected to a VPLS gateway, the PLSB gateway being an endpoint of at least an unicast path of the PLSB domain, and the VPLS gateway being an endpoint of the set of the LAN segments.

19. The system as claimed in claim 15, wherein configuring the virtual links comprises assigning a respective predetermined cost to each virtual link, such that every path on the shortest path tree computed by the Link-State controlled network domain between the set of LAN segments and every address in the Link-State controlled network domain traverses only one of the peer attachment points.

20. The system as claimed in claim 19, wherein configuring each virtual link comprises;
 setting the predetermined cost assigned to a first virtual link connected to a selected one of the attachment points based on an available capacity of the set of LAN segments; and
 setting the predetermined cost assigned to a second virtual link artificially high, such that, under fault free conditions a shortest path computed in the Link-State controlled network domain will never traverse the attachment point connected to the second virtual link.

21. The system as claimed in claim 15, wherein the pair of peer attachment points are selected from among a plurality of attachment points between the Link-State controlled network domain and the Ethernet Bridging domain.

22. The system as claimed in claim 21, wherein two or more virtual nodes are provided, each virtual node being connected via virtual links to a respective pair of peer attachment points and representing in the Link-State controlled network domain a respective set of LAN segments.

23. The system as claimed in claim 22, wherein at least one of the plurality of attachment points is a member of at least two pairs of peer attachment points.

* * * * *